United States Patent
Marakov (10) Patent No.: US 7,022,652 B2
(45) Date of Patent: Apr. 4, 2006

(54) COMPOSITIONS AND METHODS FOR TREATING SUBTERRANEAN FORMATIONS

(75) Inventor: Vladimir Marakov, Prague (CZ)

(73) Assignee: GeoStim Group LLC, Lone Tree, CO (US)

( * ) Notice: Subject to any disclaimer, the term of this patent is extended or adjusted under 35 U.S.C. 154(b) by 6 days.

(21) Appl. No.: 10/898,753

(22) Filed: Jul. 26, 2004

(65) Prior Publication Data
US 2005/0026789 A1    Feb. 3, 2005

(30) Foreign Application Priority Data
Jul. 28, 2003    (RU)    ............... 2003123083

(51) Int. Cl.
*C09K 3/00*    (2006.01)
(52) U.S. Cl. .................. 507/276; 507/277; 507/939; 507/141; 507/145
(58) Field of Classification Search ............... 507/276, 507/277, 939, 141, 145
See application file for complete search history.

(56) References Cited

U.S. PATENT DOCUMENTS

| | | | |
|---|---|---|---|
| 3,990,978 A | 11/1976 | Hill | |
| 4,137,969 A | 2/1979 | Phalangas et al. | |
| 4,359,391 A | 11/1982 | Salathiel et al. | |
| 4,478,804 A | 10/1984 | Watanabe et al. | |
| 4,539,013 A | 9/1985 | Sweeney | |
| 4,611,040 A | 9/1986 | Olson et al. | |
| 4,648,456 A | 3/1987 | Lamb et al. | |
| 4,778,833 A | 10/1988 | Van der Drift et al. | |
| 5,259,455 A | 11/1993 | Nimerick et al. | |
| 5,366,643 A | 11/1994 | Walker | |
| 5,529,125 A | 6/1996 | Di Lullo Arias et al. | |
| 5,580,844 A | 12/1996 | Swarup et al. | |
| 6,491,099 B1 | 12/2002 | Di Lullo Arias et al. | |
| 2002/0189810 A1 | 12/2002 | DiLullo et al. | |
| 2003/0073585 A1 | 4/2003 | Di Lullo Arias et al. | |

FOREIGN PATENT DOCUMENTS

| | | |
|---|---|---|
| RU | 2 020 964 C1 | 10/1994 |
| RU | 2 032 342 C1 | 4/1995 |
| RU | 2 042 330 C1 | 8/1995 |
| RU | 2 070 964 C1 | 12/1996 |

OTHER PUBLICATIONS

Titova et al., Chemical Abstract of Zhurnal Neorganicheskoi Khimii (1987), vol. 32, No. 11, pp. 2615-15.*

(Continued)

*Primary Examiner*—Philip C. Tucker
(74) *Attorney, Agent, or Firm*—Dorr, Carson & Birney, P.C.

(57) ABSTRACT

A solution containing a compound having the general formula $XF \cdot nH_2O_2$, wherein X is $K^+$, $Na^+$ or $NH_4^+$ and n is an integer from 1 to 3 (e.g., a peroxysolvate of potassium fluoride compound such as potassium fluoride hydroperoxide ($KF \cdot H_2O_2$)) is injected into a subterranean formation in order to increase its permeability, especially with respect to hydrocarbon flow. These compounds serve to dissolve a wide variety of subterranean formation minerals (e.g., siliceous materials as well as carbonaceous materials). Potassium hydrofluoride ($KHF_2$), can be employed with these compounds to produce particularly efficacious subterranean formation treatment solutions.

14 Claims, 1 Drawing Sheet

OTHER PUBLICATIONS

Titova et al., Chemical Abstract of Zhurnal Neorganicheskoi Khimii (2003), vol. 48, No. 5, pp. 849-853.*

Curtis Crowe, Jacques Masmonteil, Eric Touboule and Ron Thomas, Trends in Matrix Acidizing, Oilfield Review, Oct. 1992, pp. 24-40.

Excerpts (excerpt from p. 2 and pp. 5-9) of a letter dated Apr. 15, 2004 from Christopher E. Kondracki of Specialized Patent Services, Arlington, Virginia.

Excerpt (search result pp. 1-21) from an email dated Apr. 24, 2004 from Christopher E. Kondracki of Specialized Patent Services, Arlington, Virginia.

* cited by examiner

Fig. 1

COMPOSITIONS AND METHODS FOR TREATING SUBTERRANEAN FORMATIONS

BACKGROUND OF THE INVENTION

1. Field of the Invention

The present invention generally relates to compositions and methods for treating subterranean formations in order to make them more permeable. Such subterranean formations may, for example, be comprised of silicate minerals or carbonate minerals. Be the subterranean formation minerals as they may, this invention is especially concerned with matrix acidizing and/or fracture acidizing them in order to increase their permeability. Matrix acidizing is conducted below formation-fracturing pressures. Conversely, fracture acidizing is conducted at formation-fracturing pressures. In either case, any resulting increase in permeability of a formation can lead to increased production of a targeted material contained therein. For example, increased permeability in a hydrocarbon-bearing formation can lead to increased petroleum and/or natural gas production. Such increased permeability can also lead to increased production of non-hydrocarbon materials (e.g., carbon dioxide, sulphur, water, helium, etc.) from subterranean formations containing such materials.

Most matrix acidizing operations are aimed at increasing hydrocarbon production by dissolving subterranean formation clogging materials (especially those located near a borehole) and/or by invasion of existing pores and fractures in a subject formation. Any of these operations can be accomplished by pumping treatment fluids (e.g., acidic, aqueous solutions and/or gases) into a subject subterranean formation under pressures and flow rates such that the treatment fluid flows to and around any targeted subterranean formation clogging materials and/or into existing pore spaces and/or into existing fractures in the formation that may be clogged by granular materials. The acid components of such treatment fluids then chemically react with certain minerals contained in the formation clogging materials, pore spaces and clogged fractures. Such matrix acidizing operations also can create so-called "wormhole" systems in a matrix acidized formation. In effect, such wormhole systems are complex, three dimensional arrays of interconnected passageways.

Those skilled in the subterranean treatment arts will appreciate that there are at least four general types of matrix acidizing treatments: (1) wellbore cleanouts, (2) near-wellbore stimulation treatments, (3) intermediate matrix stimulation treatments and (4) extended matrix acidizing treatments. Each calls for use of different treatment techniques according to the distance between a wellbore and a targeted zone in a given subterranean mineral body. Those skilled in these arts also will appreciate that the acid treatment solutions used in each of these four treatment techniques tend to penetrate into subterranean formations for only relatively short distances before they are chemically spent. Indeed, this fact is part of the underlying basis for distinguishing between wellbore cleanouts, near-wellbore stimulation treatments, intermediate matrix stimulation treatments and extended matrix acidizing treatments.

It also should be understood that the selection of acids (and their concentrations) for each of these four treatment methods involves, among other things, further consideration of a given subterranean formation's: (1) mineral composition, (2) structure, (3) permeability, (4) porosity, and (5) physical strength. Other factors which then must be considered in the acid identity (concentration) selection process include, but are by no means limited to: (6) reservoir fluid properties, (7) temperatures, (8) pressures, and (9) any limitations on treatment fluid injection rates. Moreover, the identity and amounts of various additives, e.g., corrosion inhibitors, surfactants, and iron-control agents, friction reduction agents and so on, will vary with changes in the identity of a treatment acid (and its concentration). Cost considerations, ease of mixing, ecological concerns and safety considerations also are important factors in most matrix acidizing operations.

By way of distinction from matrix acidizing operations, fracture acidizing operations are carried out by pumping acidic fluids into subterranean formations at pressures and flow rates high enough to fracture that formation. There are also at least four primary fracture acidizing techniques: (1) fluid-loss control, (2) conductivity enhancement, (3) etched height control and (4) a variety of very specifically tailored fracture treatments. Regardless of the type of fracture acidizing technique being carried out, the acidic components of the high pressure fluids employed generally serve to etch fluid flow channels in newly fractured regions of that formation. The treatment solution volumes needed to carry out most fracturing operations are, however, generally much larger than those required for matrix acidizing operations. Hence, the expense of a fracture treatment solution may become a far greater factor relative to that of a matrix acidizing operation. Such cost of materials considerations also imply extensive design and/or lab work to determine, among other things, the mineral nature of the formation being fractured, identification of the most suitable acids, their optimal concentrations and/or the need for other chemical agents and/or particulate materials in the fracture treatment solution selected.

For example, some fracture treatments call for the use of particulate materials such as silica flour and 100-mesh sand particulates. That is to say that such particulate materials can be used to advantage in some fracture acidizing operations—but not in others—depending on the treatment acid selected. Other granular materials (e.g., graded rock salt, benzoic acid flakes, wax beads, wax buttons and/or oil-soluble resin materials) may have to be employed in other fracture acidizing operation depending on the identify of the acid selected (e.g., HF versus HCL). Selection of any of these particulate materials also implies further consideration of a host of subtle, complex and interrelated factors that very often compete with each other when they are used in the same subterranean treatment solution and/or fracture acidizing technique.

Prior Art HF and/or HCL Systems

Those skilled in the subterranean treatment arts also will appreciate that even though a wide variety of subterranean treatment solutions have been developed over the years, when all is said and done, hydrofluoric acid (HF), hydrochloric acid (HCL), as well as mixtures thereof, continue to be of the utmost importance. Hence, they will be used as a basis of comparison for the compounds, compositions and methods taught by the present patent disclosure. The pros and cons associated with the use of these two prior art acid types are numerous, wide ranging and sometimes rather subtle. For example, one might begin a comparison of the subterranean treatment uses of these acids by starting with HF and noting that it: (1) reacts with clays and silicates to remove formation damage caused by these materials, (2) is not normally used to treat limestone or dolomite formations or sandstone formations that also contain more than about 20% calcium carbonate because there is a strong possibility of HF forming calcium fluoride precipitates which can act as formation plugging materials, (3) is not normally used in sandstone formations without preceding its use with dilute HCL treatments, (4) is compatible with relatively more additives and matrix diverting agents (except rock salt) than HCL, (5) often requires a spacer between itself and a displacement fluid, and (6) requires shut-in times that are relatively more limited in order to reduce the possibility of formation damage through creation of formation clogging HF reaction product precipitates.

Next, it should be noted that certain subtle techniques concerning the use of HF as a subterranean treatment agent have been developed over the years. These subtleties often revolve around a desire to slowly form an active HF agent—preferably after the treatment solution has been injected into a subterranean formation—as opposed to directly injecting an HF-based treatment solution into that formation. For example, some HF treatment solutions have been created by first mixing ammonium bifluoride with water and then with HCL in order to slowly convert the ammonium bifluoride to hydrofluoric acid (HF)—after the solution has been pumped into a subterranean formation. Thus, the resulting relatively slow creation of the active HF agent enables the treatment solution to penetrate farther into a formation before it is chemically spent in reacting with those formation minerals that are dissolvable in HF. Hence, use of ammonium bifluoride is often preferred over the direct use of HF in many subterranean treatment operations.

Ammonium bifluoride starting materials also are often preferred over HF starting materials because ammonium bifluoride can be shipped to the field in the form of solid flakes that are readily soluble in water (that may be locally available). That is to say that the fact that ammonium bifluoride can be shipped in solid forms has important freight cost and ease of handling implications. It should also be noted, however, that ammonium bifluoride dust is extremely dangerous if it contacts the skin or is inhaled. The equipment and precautions against such skin contact or inhalation are, however, cumbersome for workers to employ, as well as expensive to buy and properly maintain.

Another alternative HF related subterranean treatment technology revolves around the finding that HF can be initially replaced with a fluoroboric acid precursor which also slowly hydrolizes to HF. Among other things, this chemical action causes certain clay platelets to fuse together and thereby cause them to more readily migrate toward a wellbore in a relatively more controlled manner. Still other alternative technologies employ organic acids (e.g., formic acid, acetic acid) in place of mineral acids such as HF because reactions of organic acids are generally easier to inhibit (especially at relatively high temperatures). Organic acids are also much more readily biodegradable. Such organic acids may, however, require use of greater acid quantities and/or concentrations as well as use of entirely different corrosion inhibitors, surfactants, precipitation prevention agents, stabilization agents, friction reduction agents and so forth relative to those used in conjunction with mineral acids such as HF and HCL.

By way of contrast with hydrofluoric acid treatments of silicate formations, carbonate formations (e.g., those containing large proportions of limestone and dolomite) are usually treated with hydrochloric acid. There are at least three generally recognized modes of hydrochloric acid attack upon carbonate formations. First, so-called "compact dissolution" occurs when hydrochloric acid expends itself on the face of such a formation. Second, so-called "uniform dissolution" takes place when hydrochloric acid reacts with carbonate minerals in ways such that fluid flow-penetration will be similar to the volumetric penetration of the acid. Third, highly conductive wormholes tend to be created in carbonate formations when hydrochloric acid invasion of such formations is uneven. Indeed, wormholing is the preferred mode of chemical attack upon carbonate formations. Hydrochloric acid treatments are also influenced by such factors as: surface reaction rates, acid diffusion rates and acid injection rates of the hydrochloric acid. It also should be noted that, generally speaking, HCL/carbonate reaction products are readily soluble in water. Hence, these reaction products are much less likely to precipitate out of solution relative to precipitation of HF/carbonate reaction products.

Next, it should be noted that regardless of whether the formation treatment is of the matrix acidizing variety or of the fracturing variety, most acid-based subterranean treatment solutions (such as those employing HF and/or HCL) usually include one or more agents in addition to their subterranean mineral dissolving acids. By way of examples only, such acid-based subterranean treatment solutions may, depending on the particular acid employed, contain different: (1) corrosion inhibitors, (2) surfactants, (3) precipitation prevention agents, (4) clay stabilization agents, (5) diverting agents, (6) friction reducing agents and the like (see for example U.S. Pat. No. 5,366,643 which teaches use of certain corrosion inhibitors in conjunction with HCL-based treatment solutions). These additional agents are generally well known. However, some of the more important points that might be made concerning certain reasons for their use, and/or representative examples of such additional agents, are listed below because they also can be employed as additional agents in the treatment solutions of the present patent disclosure.

Corrosion Inhibitors

Acids chemically react with steels to produce iron salts and hydrogen. Steel metallurgy, acid type (mineral, organic), acid strength and/or temperature are important factors in these reactions. The first widely used corrosion inhibitor was arsenic. Because of increased environmental concerns concerning the toxicity of arsenic, a variety of organic inhibitors have since been developed. Depending on the acid type being employed, many are based upon acetylenic alcohols (e.g., octynol and propargyl alcohol).

Iron Precipitation Prevention Agents

Steel dissolves to produce ferrous ions which, in the presence of dissolved oxygen, are often transformed into ferric ions. Ferric ions will normally precipitate from a treatment solution as its acid is used up and, hence, as the pH of the solution rises. Generally speaking, iron precipitation is addressed through use of chelation, sequestration and reduction agents depending on, among other things, the identity of the acid being employed in a given treatment solution.

Clay Stabilization Agents

Formation clays can react (by ion exchange or partial dissolution) with treatment solutions and thereby cause damage to a formation. To deal with this, various salts such as ammonium chloride and potassium chloride are added to different acid treatment solutions as clay stabilizers. However, it might also be noted here that potassium chloride is not normally employed when HF is present in the treatment solution because of the ability of its secondary precipitation product, potassium fluorosilicate, to cause formation plugging. It is also known that certain cationic materials (quaternary amines or polymers with similar reactive groups) can prevent clay swelling.

Surfactants

Surfactants e.g., foaming agents, water-wetting agents, oil-wetting agents, emulsifiers, demulsifiers and antisludge agents all have effects upon surface and/or interfacial tensions of subterranean treatment solutions. For example, water-wetting surfactants serve to lower the surface tension of HF aqueous treatment solutions and thereby increasing their ability to enter small pores. Demulsifiers serve to break up those viscous emulsions that tend to form between petroleum and certain acids. Ionogenic and nonionic agents are often used as surface active agents.

Diverting Agents

The most widely used materials used to divert treatment solutions are those particulates that are insoluble in the treatment solution. Such agents would include, but not be limited to, benzoic acid, naphthalene, gelsonite, wax beads and/or oil-soluble resins. Other systems have employed polymers that crosslink as the pH level of the treatment solution rises.

Friction Reducing Agents

Friction reducing agents are deposited on inside pipe wall surfaces in order to reduce the attractive forces between a given treatment solution and the piping system through which they will be pumped. In other words, the inside surfaces of the pipes being employed are "lubricated" so that pumping pressures—and, hence, pumping costs—can be lowered.

2. Discussion of the Background

The art/science of matrix acidizing traces its roots back over a hundred years, e.g., to a patent awarded to Herman Frasch (of Standard Oil) that taught the use of hydrochloric acid (HCL) to stimulate carbonate formations. That technology was, however, largely given up for many years because of the severe corrosion problems associated with the use of HCL in steel piping and wellhead equipment. It was, however, eventually revived (in the 1930's) after Dr. John Grebe (of Dow Chemical Company) discovered that arsenic can inhibit the corrosive effects of HCL on steel. This technology was, however, likewise, eventually given up owing to the extremely toxic nature of arsenic.

Earlier practitioners of the subterranean treatment arts also came to much more fully appreciate that very significant distinctions must be made between acid treatments of silicate formations—as compared to acid treatments of carbonate formations. It also came to be better appreciated that many minerals are bonded together by various kinds and amounts of cementing materials such as clays, feldspars, quartz, calcite, etc., and that many of these cementing materials are themselves silicates or carbonates that react differently with HF or HCL. It also came to be better appreciated that hydrofluoric acid reacts faster with some kinds of silicates relative to other kinds of silicates. For example, it is now generally understood that hydrofluoric acid tends to react relatively more quickly with authigenic clays such as smectite, kaolinite, illite and chlorite, especially at temperatures above about 150 degree F. It also came to be better recognized that, since clays are often a part of those cementitious materials that hold individual sandgrain components of sandstone materials together, dissolution of such clays tends to physically weaken certain matrices, especially sandstone matrices in the vicinity of wellbores.

Be all of the above matters as they may, it eventually came to be generally accepted that hydrochloric acid (HCL) does not react very well with most silicate materials, but that hydrofluoric acid (HF) does. This is the generally held modern view as well. For example, U.S. Pat. No. 5,529,125 (col. 1, lines 23–29) notes that treatment of siliceous formations with hydrochloric, acetic and formic acids "has little or no effect because they do not react appreciably with the silica and silicates which characterizes the sandstone formations." Thus, many of the most widely used current methods of treating sandstone formations involve introducing hydrofluoric acid (or hydrofluoric acid precursors) into them, either via matrix acidizing treatments or via fracture acidizing operations.

Over the years, it also came to be recognized that many acid solutions tend to precipitate various complexes, and that these complexes (e.g., those of sodium and potassium salts of fluosilic acid) are highly insoluble, gelatinous materials that tend to plug formation pore spaces. It also came to be better understood that certain secondary reaction products will remain in solution if the pH of a treatment solution is kept low. By way of example only, U.S. Pat. No. 4,648,456 teaches acid treatment of hydrocarbon-containing formations through use of treatment solutions containing hydrofluoric acid and excess fluoride. In any case, both matrix acidizing operations and fracture acidizing operations are often highly concerned with using additional chemicals and/or field practices that serve to delay certain acid/mineral reactions and/or prevent precipitation of a wide variety of acid reaction products—given the type of mineral encountered.

Indeed, precipitation of various acid/mineral reaction products has proved to be an extremely persistent and vexing problem. In part, this follows from the multicomponent nature of the minerals that make up subterranean formations. Given these mineral complexities, prevention of precipitation of undesired HF acid/mineral reaction products has heretofore been tried (with varying degrees of success) through use of: (1) buffered systems, (2) other acids having fluorine atoms, e.g., fluoroboric acid, hydrofluorophosphoric acid and hydrofluorotitanic acid and (3) mixtures of esters and fluorides to generate HF in situ. By way of further examples of those methods employed to prevent precipitation of undesired reaction products, it might also be noted that phosphonate materials also have been used to prevent and/or inhibit certain silicate scales from forming during use of certain hydrochloric/hydrofluoric acid systems as well as during use of certain organic acid/hydrofluoric acid systems such as those that employ formic acid/hydrofluoric acid mixtures (see again U.S. Pat. No. 5,529,125).

Another widely used practice to prevent formation of HF based precipitates is to preflush a hydrocarbon-bearing formation with HCL in order to dissolve certain carbonate minerals that may be contained therein. That is to say that, if such carbonate minerals are not pre-dissolved, they may well react with an injected HF solution to produce calcium fluoride ($CaF_2$) reaction products that readily precipitate from a HF treatment solution and then clog the subject subterranean formation. Consequently, under many field practices, a HF/HCL solution is only injected into a formation after it has been pre-flushed with an HCL solution. After such treatments, many formations are also overflushed with weak HCL or ammonium chloride ($NH_4CL$) solutions in order to force undesired reaction products away from a wellbore zone.

It was also eventually discovered that combining hydrofluoric acid (HF) with hydrochloric acid (HCL) in certain ratios serves to reduce the precipitation of certain reaction products that cause plugging. However, some guidelines previously used with respect to such HF/HCL mixtures have changed over the years. For example, optimum HCL/HF ratios were originally thought to be about 4:1 (e.g., 12% HCL, 3% HF solutions were, and still are, commonly employed) in virtually all cases. This ratio has, however, been modified, e.g., up to about 9:1 when certain minerals are present. These acid ratio modifications were based upon subsequent findings that reactions of certain clays with HF produce previously unrecognized secondary reaction products that tend to reprecipitate out of treatment solutions having HCL/HF ratios near 4:1, but do not precipitate out of solutions having ratios near 9:1. Be all this as it may, many, many treatment solutions containing hydrochloric acid/hydrofluoric acid mixtures are still widely used. They are often referred to as "mud acid(s)."

Thus, in summarizing the prior art, it might be said that both matrix acidizing operations and fracture acidizing operations each present a wide variety of problems associated with the identity of the acid(s) selected to carry out a given kind of treatment on a given type of subterranean mineral. Indeed, after more than 100 years of empirical observation of the effects of various acids, well research and development work and the like (e.g., with respect to core flow studies, geological and mineralogical studies, reaction kinetics, physicochemical modeling of propagating reaction fronts, solubility of reaction products testing, modern computer modeling, and the like), it can still be said that formulation of optimal matrix acidizing or optimal fracture acidizing solutions, for a targeted formation, is still highly problematic, complex and, hence, expensive to design and deploy. It might even be said that treating subterranean formations with a view toward increasing their permeability is still every bit as much an art as it is a science. But, it is also true that most newly developing technologies in the subterranean formation treatment arts, are, for the most part, still largely directed at: (1) retarding the acid/mineral reactions of a given formation material in order to achieve greater penetration of the formation before the subject acid is spent, (2) retarding corrosion of equipment, e.g., steel tubulars, wellheads, screens, etc., as well as retarding degradation of those polymeric seals found in such equipment, (3) preventing undesired chemical reactions (and especially those causing precipitation of reaction products that tend to plug such formations), (4) addressing environmental concerns, (5) addressing safety concerns and (6) lowering the costs of all such subterranean acidizing operations (not only by lowering material costs, but, even more importantly, by lowering the costs associated with the highly skilled and, hence, highly expensive labor needed to design and carry out such subterranean formation treatments).

Be all of the above problems, complexities and dilemmas of the prior art as they may, applicant has discovered that use of certain hereinafter described compositions in subterranean treatment operations can mitigate, otherwise improve upon and/or even virtually eliminate many of the above-noted problems. Indeed, it might even be fair to say that use of applicant's compositions goes beyond certain areas that were previously regarded as formidable technical barriers in the subterranean treatments arts. For example, the prior art does not disclose otherwise suitable subterranean treatment acids that are capable of attacking silicate minerals as well as carbonate minerals with comparable overall efficaciousness.

Applicant's compounds have this very, very desirable quality. Thus, the previously noted pros and cons surrounding the use of HF, HCL and/or mixtures thereof, in view of the type of formation mineral being treated (e.g., silicate versus carbonate minerals), are rendered far less important, or even moot, through use of applicant's subterranean treatment solutions. Nor does the prior art teach the use of chemical reactions that produce gases (e.g., oxygen) in quantities that serve to further power penetration of a treatment solution into a formation. In short, applicant has found that use of the hereinafter described family of compounds in subterranean treatment solutions addresses most of the above prior art concerns to very high degrees of satisfaction.

SUMMARY OF THE INVENTION

Applicant has found that use of certain compounds having the general formula $XF.nH_2O_2$, wherein X is $K^+$, $Na^+$, or $NH_4^+$ and n is an integer from 1 to 3, in subterranean treatment solutions, produces a number of very important and wide ranging advantages relative to the use of those prior art compounds (e.g., HCL and/or HF compositions) heretofore used for such purposes. Some of the more important members of the above noted formula are peroxysolvate of potassium fluoride compounds i.e., $KF.nH_2O_2$ compounds (hereinafter sometimes referred to as "PPF compounds" or "PPFs"), e.g., potassium fluoride hydroperoxide ($KF.H_2O_2$), potassium fluoride dihydroperoxide ($KF.2H_2O_2$) and potassium fluoride trihydroperoxide ($KF.3H_2O_2$). Mixtures of two or more such compounds can be used to advantage as well, especially in "tailoring" subterranean formation treatments in tradeoffs between chemical reactivity versus formation penetration distances. For example, potassium fluoride hydroperoxide ($KF.H_2O_2$) is more chemically reactive than potassium fluoride dihydroperoxide ($KF.2H_2O_2$), but does not penetrate as far before it is chemically spent. This follows, in part, from the fact that reactions of potassium fluoride hydroperoxide ($KF.H_2O_2$) with minerals produce less oxygen gas relative to those of potassium fluoride dihydroperoxide ($KF.2H_2O_2$). Similarly, potassium fluoride dihydroperoxide ($KF.2H_2O_2$) is more chemically reactive than potassium fluoride trihydroperoxide ($KF.3H_2O_2$), but does not penetrate as far, for analogous, oxygen production related reasons. Thus, mixtures of 2 or more of these compounds can be employed to obtain optimal reactivity vs. penetration distance results.

Be that as it may, use of applicant's $XF.nH_2O_2$ compounds serves to create more permeable subterranean formations relative to those created by the previously described prior art subterranean treatment acids. Such increased permeability can lead to enhanced production of a desired product from a given formation. For example, improved production of petroleum, natural gas, carbon dioxide, water, sulfur, helium and the like can be obtained from an appropriate subterranean formation that has been made more permeable by use of subterranean treatment solutions formulated and used according to the teachings of this patent disclosure.

One extremely important advantage of this invention follows from the fact that applicant's $XF.nH_2O_2$ compounds can be used to dissolve both silicate mineral materials and carbonate mineral materials with similar effectiveness. Thus, for example, many hydrocarbon well stimulation design considerations, e.g., use of HCL vs. use of HF and/or mixtures thereof (in varying proportions), based upon the type of mineral(s) that comprise a given formation, and in view of the use of a wide variety of other agents, preflush treatments, identification of precipitation products, and the like, can be greatly minimized or, in many instances, virtually eliminated. Again, these facts and circumstances have great economic consequences, especially in terms of time savings for highly skilled (and, hence, highly paid) well design engineers and/or wellhead technicians. It might also be noted here that solutions of applicant's PPF compounds also can serve just as well as fracture acidizing fluids as matrix acidizing fluids. This attribute also serves to greatly reduce well design and/or well operation work efforts.

Moreover, the reaction times of applicant's $XF.nH_2O_2$ compounds, and especially the peroxysolvate of potassium fluoride compounds, are relatively slow (e.g., compared to those of HCL and/or HF compounds) with respect to a very wide variety of formation minerals (e.g., silicates, carbonates, mixtures of silicates and carbonates as well as other entirely different subterranean formation minerals). As was previously discussed, "slowness" of reaction time can be a great virtue in treating certain subterranean formations. Moreover, this slowness is the case in treating all manner of different subterranean minerals (e.g., silicates, carbonates, mixtures thereof and so on). These relatively slower reaction times imply that applicant's treatment solutions can penetrate relatively farther into a formation before they are chemically spent or used up in reacting with whatever kinds of minerals they may encounter in a given subterranean formation. Applicant's compounds also can be encapsulated to further slow their reaction times. The herein described subterranean treatment solutions also can be employed as viscosity modifying agents when used in conjunction with suitable viscosity modifying agents.

The relatively slower reaction time attribute of these compounds also allows them to be used in matrix acidizing operations at relatively lower pumping pressures. Hence, their use in this manner is less likely to dislodge "fines" (fine particles) that otherwise might tend to plug a formation undergoing a matrix acidizing treatment. It also should be noted that most PPF/mineral reaction products are soluble (especially in water), and, hence, are not inclined toward precipitating out of applicant's PPF treatment solutions—and then plugging the formation being treated. Moreover, applicant has found that when certain PPF/mineral reaction products do precipitate from the subterranean treatment solutions of this patent disclosure, they tend to form granules (rather than gelatinous materials) that have void spaces between contiguous granules. The resulting void space volume between such granules implies greater permeability relative to more impervious gelatinous precipitation products.

Applicant's subterranean treatment operations are, however, also generally characterized by the fact that they often require somewhat longer "shut in" times relative to some prior art treatment (e.g., HF and/or HCL systems) solutions. Be that as it may, shut in times of from about 10 hours to about 50 hours will normally be required in applicant's subterranean treatment operations. Shut in times of from about 24 to about 36 hours are, however, the more likely time requirements for good overall technical results.

As previously noted, the ability of applicant's solutions to penetrate relatively farther into subterranean formations before being chemically used up follows at least in part from the fact that oxygen gas is one of the products of their reactions with a wide variety of minerals normally encountered in subterranean formations. That is to say that, once formed, this oxygen gas reaction product creates a gas pressure and, hence, a motive force that serves to propel, drive, urge, etc. any unused $XF.nH_2O_2$ compound-containing solution "deeper" (i.e., laterally, upward, and/or downward) into a formation body, relative to a solution that is not so propelled by a gas product created by its own chemical reactions with a subterranean mineral. Thus, the "reach" or volume of a zone of permeability may be expanded through use of applicant's oxygen releasing—and, hence, at least partially self propelling—treatment solutions.

It also should be emphasized that applicant's subterranean treatment solutions will perform at very low PPF concentrations e.g., as low as about 0.5 weight percent of a liquid solution thereof. Such low concentrations imply important cost advantages over prior art treatment solutions having much higher active agent concentration requirements. Be that as it may, applicant's subterranean treatment solutions will perform over a very wide range of $XF.nH_2O_2$ concentrations. Indeed, upper PPF concentration levels (e.g., above 50% by weight) in the PPF embodiments of applicant's subterranean treatment solutions are based as much upon economic considerations as upon technical ones. However, in balancing the efficacy of various treatment solutions versus their costs, applicant believes that treatment solutions containing from about 0.7 to about 20.0 weight percent $XF.nH_2O_2$ compound(s) will give very good overall technical efficacy versus cost results. This is especially true in the case of PPF compounds.

When the PPF compositions of this patent disclosure are in their solid (e.g., granular or flake-like) forms, the PPF component of such compositions will normally constitute from about 2.5 to about 97.5 weight percent of the solid composition, with the remainder being a chemical stabilizer such as potassium hydrofluoride ($KHF_2$). Solid compositions comprised of about 50 weight percent PPF compound(s) and 50 weight percent of this chemical stabilizer will produce treatment solutions having wide ranging utilities. Normally, any additional components (corrosion inhibiting agents, surfactants, friction reducing agents and the like) used with applicant's PPF formulations will be added to the carrier fluids for these solid compositions in the field.

The PPF embodiments of applicant's $XF.nH_2O_2$ compounds are also much more compatible with modern environmental concerns (especially when compared to HF and/or HCL systems). That is to say that the PPF compounds of this patent disclosure are not toxic; moreover, they are readily biodegradable. It also might be noted in passing that, in the absence of any pH influencing agents, the pH of applicant's PPF treatment solutions will be about 7.0. This fact has useful implications in its own right. At the very least, it implies that these solutions are far less hazardous relative to those HF, HCL acids heretofore employed as subterranean treatment agents. Hence, they can be more safely mixed above ground, injected into the ground and then left down-hole to be biodegraded rather than recovered (at great expense) pursuant to ecological concerns and/or legal mandates associated with recovering more dangerous treatment solutions. Another great advantage follows from the fact that applicant's PPFs are not corrosive to steel (nor to iron, copper or brass). Indeed, they form a protective film over steel that serves to protect it from other corrosive fluids that may be used in the overall operation of a given well. Moreover, and unlike most prior art treatment acids, applicant's PPF compounds do not chemically attack sealing rings and other devices made of polymeric materials (e.g., rubber, plastics and the like) commonly employed in oil field equipment.

Yet another advantage of applicant's PPFs resides in the fact that they can be shipped to the field as solids (e.g., in granular or flake-like forms). In other cases, they can be shipped to the field as highly concentrated liquids. Wellhead workers will, however, normally prefer to have these PPFs shipped in their solid forms in conveniently sized bags, boxes, plastic containers and the like—and then mix them with their carrier fluids, additional agents, etc., in the field. Aside from the ammonium bifluoride compounds previously noted, this ability to be shipped in solid forms is not true of most other subterranean formation treatment agents. For example, hydrofluoric acid and hydrochloric acid are always shipped in liquid forms—at relatively much greater expense—owing to the fact that these acids are only chemically stable as liquids. These HF/HCL liquid acids also are highly toxic and otherwise dangerous to ship, store and deploy. By way of contrast, applicant's PPF compounds are much more safe and convenient to ship, store, handle and deploy.

The solid forms of applicant's PPFs also can be given relatively long shelf lives (e.g., up to about 2 years) when properly stabilized—e.g., by use of a $KHF_2$ stabilizer. These PPFs are also easily mixed in the field because they do not tend to lump when placed in contact with their carrier fluid (e.g., water); nor do they tend to settle (or phase separate) in well site holding tanks. They also can be mixed down hole as well as above ground. Moreover, they are chemically stable over a wide range of operating temperatures (e.g., from about minus 7° C. to about 150° C.—under appropriate pressure conditions). It might also be noted in passing that, relative to HF/HCL treatment solutions, the compounds of the present patent disclosure are much less inclined to swell certain clays (e.g., bentonite), especially when they are placed in carrier fluids other than water (e.g., petroleum based fluids, alcohols and crude oil). They also serve as bactericides against a wide variety of formation clogging microbial organisms.

Applicant's PPF solutions are also especially effective in stimulating production of heavier petroleums that have resisted the stimulative action of many prior art treatment solutions. Furthermore, applicant's $XF.nH_2O_2$ treatments can be used in place of conventional present day treatments (e.g., HCL and/or HF treatments), or they can be used after such conventional treatments have reached their technical and/or economic limits. By way of illustration of this point, applicant's PPF solutions produced greater permeability in petroleum-containing formations from which no further economic production could be obtained through use of commonly employed prior art treatment solutions. For example, a treatment solution formulated according to the teachings of this patent disclosure (containing $KF.H_2O_2$ and a $KHF_2$ stabilization agent) was injected into a well whose petroleum production had fallen to about 0.68 tonnes/day using a commonly employed treatment solution. Thereafter, treatment of this well with one of applicant's PPF treatment solutions raised the well's production to 56.0 tonnes/day. Needless to say, such greater production, especially after prior art methods have failed, has very significant economic implications.

Applicant's $XF.nH_2O_2$ compounds can be employed with various carrier fluids (e.g., water, petroleum-based fluids such as diesel fuel, kerosene and or distillates, alcohols and crude oil). These carrier fluids can further comprise propellant gases such as steam, carbon dioxide, nitrogen, air, various certain hydrocarbon gases, etc. Indeed, the carrier fluids for applicant's PPF solutions can themselves, in some instances, be gases/vapors (e.g., steam, nitrogen, carbon dioxide and a wide variety of hydrocarbon-based gases). Water is, however, the generally preferred carrier fluid for both technical and economic reasons. Again, water is an especially useful carrier fluid because many $XF.nH_2O_2$/mineral reaction products are soluble in water. Moreover, the quality of the water that may be successfully employed in applicant's treatment solutions can vary considerably. For example, sweet water, mineralized water, stratal water and the like (as well as mixtures thereof) can be effectively employed. The pH of a water carrier for applicant's subterranean treatment solutions also can vary over extremely wide ranges (e.g., from a pH levels as low as about 0.5 up to as high as about 14.0). Hence, a wide variety of commonly available (and hence relatively inexpensive) acidic materials (e.g., hydrochloric acid, acetic acid and sulfuric acid) or basic materials (e.g., potassium hydroxide, sodium hydroxide and calcium hydroxide) can be used to adjust the pH of applicant's treatment solutions—when they need to be so adjusted. Yet another valuable attribute of applicant's solutions is that they do not react to any great extent with certain metal ions (e.g., iron ions) that may be dissolved in ground waters that the treatment solutions of this patent disclosure may encounter.

Next, it should again be specifically noted that potassium hydrofluoride ($KHF_2$) can be employed to great advantage in conjunction with many of the $XF.nH_2O_2$ compounds of this patent disclosure for reasons other than pH adjustment. It is, for example, especially useful as a PPF stabilization agent, and especially with respect to potassium fluoride hydroperoxide ($KF.H_2O_2$). Applicant has, for example, found that potassium hydrofluoride ($KHF_2$) is particularly effective in stabilizing PPFs, e.g., to an extent such that certain solid PPFs (e.g., $KF.H_2O_2$) can have their shelf lives extended from about two weeks to about two years through use of $KHF_2$ as a PPF stabilizer. Again, this increased shelf life attribute has great practical and economic implications. This potassium hydrofluoride ($KHF_2$) stabilizer can be added to the PPF compounds during the PPF manufacturing process, or it can be added to a PPF solution in the field.

This $KHF_2$ component of a subterranean treatment solution may also aid in releasing oxygen gas from PPFs as they undergo chemical reactions with subterranean minerals. Again, this oxygen gas release produces a motive force (e.g., a motive force in its own right, i.e., a motive force beyond those supplied by mechanical pumps) for driving any remaining treatment solution farther into a given formation material; and this is true whether the formation is comprised of silica materials, carbonate materials or other minerals. It is also true whether matrix acidizing or fracturing acidizing operations are being carried out. The $KHF_2$ also can serve, in part, to retard the rate at which applicant's PPFs react with those formation minerals they encounter. Again, any such chemical reaction "slowdowns" generally serve to enhance a treatment solution's penetration into a subterranean formation. This source of such chemical slowdowns can, for example, be used in conjunction with the fact that applicant's potassium fluoride trihydroperoxide ($KF.3H_2O_2$) compositions tend to penetrate farther than the potassium fluoride dihydroperoxide ($KF.2H_2O_2$) compositions because $KF.3H_2O_2$ produces more motive force-supplying oxygen gas. Similarly, potassium fluoride dihydroperoxide ($KF.2H_2O_2$) compositions tend to penetrate farther than potassium fluoride hydroperoxide ($KF.H_2O_2$) compositions for the same analogous, oxygen gas production reasons. In some cases, the $KHF_2$ also serves to improve the complexing capacity of PPF-based subterranean treatment solutions.

This $KHF_2$ stabilization agent also can be used in subterranean treatment solutions in relatively low concentrations. In general, if used at all, a $KHF_2$ stabilization agent will normally constitute at least about 0.5% by weight of a resulting $PPF/KHF_2$/water treatment solution. Treatment solutions having from about 0.7 to about 50.0 weight percent of $KHF_2$ can more generally be employed. Here again, however, for economic reasons, as well as technical ones, treatment solutions having from about 0.7 to about 20.0 weight percent of a $KHF_2$ stabilizer will normally be employed. Thus, a representative subterranean treatment solution containing both a PPF compound and a $KHF_2$ stabilizer might comprise from about 0.7 to about 20.0 weight percent PPF and from about 0.7 to about 20.0 weight percent $KHF_2$. Thus, under the teachings of this invention, a more specific representative subterranean treatment solution might comprise:

| | |
|---|---|
| $KF \cdot H_2O_2$ | 0.7–20.0 weight percent |
| $KHF_2$ | 0.7–20.0 weight percent |
| water | Remainder |

Moreover, the $KHF_2$ stabilization agents can be used with a variety of carrier fluids such as water, alcohols, ketones, petroleum-based fluids (e.g., diesel fuel, kerosene, distillates and crude oil) and so on. And here again, in cases where $KHF_2$ is used, the carrier fluids can even be vapors/gases (e.g., steam, air, nitrogen, carbon dioxide, natural gas and/or other hydrocarbon-based gases) as well as liquids. Furthermore, it should also be noted that applicant's $XF.nH_2O_2$ treatment solutions are just as effective over comparably wide ranges of operating pressures and operating temperatures (e.g., from about minus 7° C. to about 150° C.) when they are used in conjunction with $KHF_2$, as well as when they are used alone. The fact that applicant's overall $PPF/KHF_2$ compositions are still active at 100° C. (and greater—due to superheating allowed by greater pressures) implies that a gas or vapor (such as steam or hydrocarbon vapors) can act as a carrier fluid for such compositions.

As in the case of the prior art treatment solutions, applicant's subterranean treatment solutions may further comprise a wide variety of other well known agents (e.g., those corrosion inhibitors, iron precipitation prevention agents, clay stabilization agents, surfactants, friction reducing agents and/or diverting agents previously noted in this patent disclosure, or otherwise known to those skilled in these arts). Generally speaking, each such additional agent may comprise from about 0.01 to about 5.0 weight percent of an overall treatment solution. Such additional agents, in total, will not, however, normally comprise more than about 40 weight percent of applicant's overall treatment solutions.

DETAILED DESCRIPTION OF THE INVENTION

Applicant conducted a number of experiments to establish the general and relative abilities of these $XF.nH_2O_2$ compounds (and especially the PPF embodiments of the $XF.nH_2O_2$ compounds) to chemically and/or physically dissolve various minerals at various acid concentrations, temperatures (in and out of the presence of additional agents) and so on. By way of example only, FIG. 1 graphs time on the X axis versus the chemical and/or physical dissolution rate of a representative subterranean mineral material on the Y axis under the respective dissolution actions of the two subterranean treatment solutions being compared. A first curve, labeled TK-2, is depicted by a line having a series of rectangles at certain points on that curve. It represents the chemical/physical dissolution action of a commonly employed treatment solution, known as TK-2, upon the subject mineral. A second curve, labeled PPF, is depicted by a line having a series of diamonds at certain points on that curve. It represents the chemical/physical dissolution of the same mineral by the action of a representative PPF-based solution.

Figure 1:
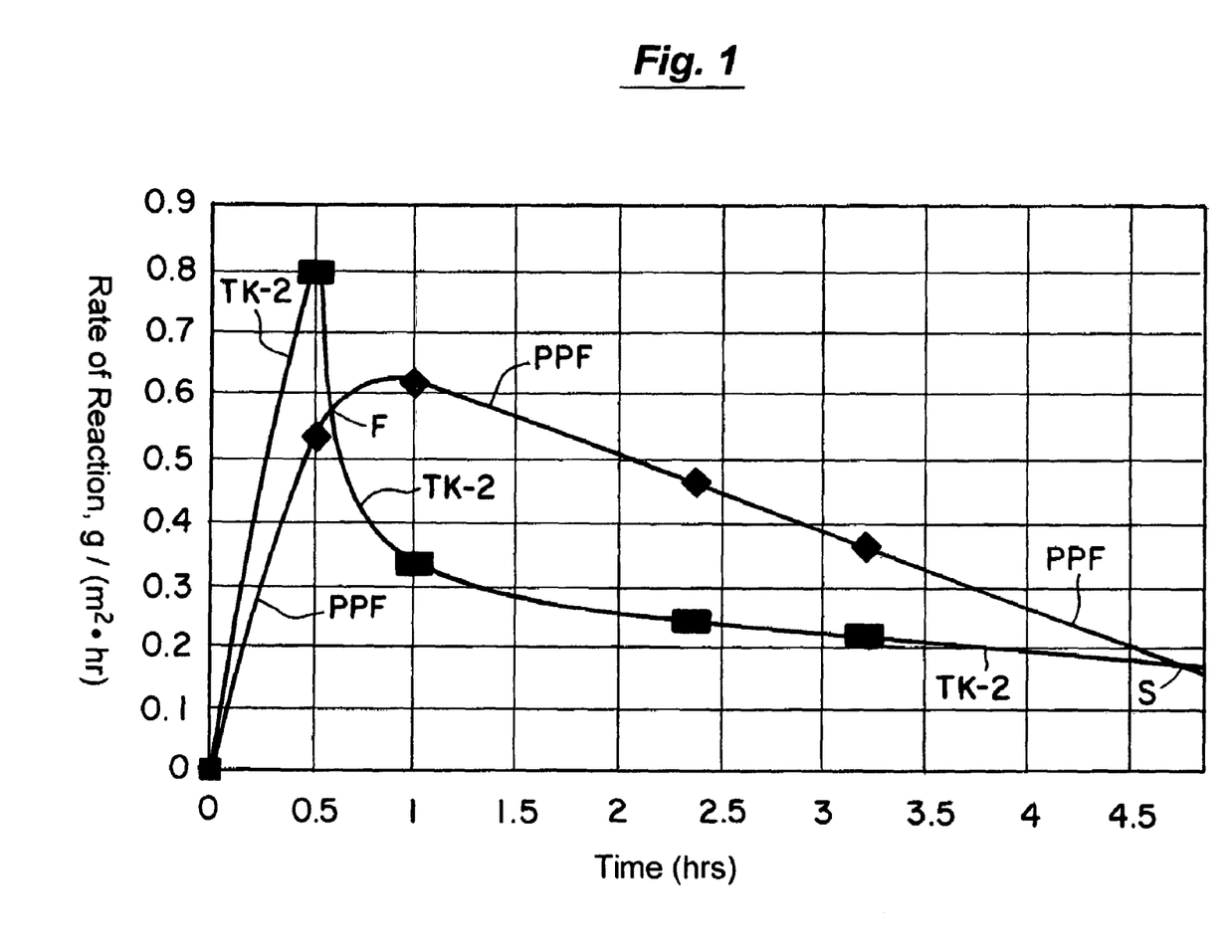
FIG. 1 depicts one of the comparative advantages of a representative PPF-based treatment solution relative to a prior art treatment solution in terms of their relative abilities to dissolve a given mineral system over time.

More specifically, the PPF solution used to create the PPF curve of FIG. 1 was comprised of 20 weight percent $KF.H_2O_2$, and 0.3 weight percent $KHF_2$ and water. The TK-2 solution was comprised of ammonium chloride, ammonium fluoride, a surface active agent and certain chemicals that encourage production of HCL and HF by hydrolysis of the ammonium chloride and the ammonium fluoride ingredients. This commercially available TK-2 solution was mixed with five parts of sweet water to create a resulting treatment solution. The mineral material used in each test was the same type (and the same physical form) of siliceous material (i.e., quartz tubes). The relative ability of each solution (PPF versus TK-2) to dissolve the quartz material was confirmed by weighing the respective quartz tube materials at various points in time (0.5 hrs., 1 hr., 2.4 hrs., 3.2 hrs., 4.7 hrs. as generally suggested by the data points in FIG. 1). In effect, the weight differences of the quartz tubes over time measured the relative abilities of the two solutions (PPF versus TK-2) to dissolve the subject quartz material.

FIG. 1 also shows that the curve labeled TK-2 reaches its peak rate of reaction (i.e., about 0.8 $gr/(m^2 \cdot hr)$) in about 0.5 hours. Thereafter, its reaction rate falls off relatively quickly. For example, after about one hour's time its reaction rate has fallen to about 0.34 $gr/(m^2 \cdot hr)$. After that, the TK-2 solution's reaction rate decays more slowly. For example, after about 3.75 hours the TK-2 reaction rate has fallen to about 0.2 $gr/(m^2 \cdot hr)$. By way of contrast, the curve labeled PPF reaches its peak rate of reaction (i.e., about 0.62 $gr/(m^2 \cdot hr)$) in about 0.9 hours. Thereafter, it decays much more slowly relative to the decay of the TK-2 curve. For example, the reaction rate of the PPF solution, after about 2.4 hours, is about 0.45 $gr/(m^2 \cdot hr)$. By way of further comparison, the reaction rate of the TK-2 curve is about only 0.25 $gr/(m^2 \cdot hr)$ after the same 2.4 hours. It also should be noted that these two curves (TK-2 and PPF) have a first point of intersection F at about 0.6 hours when they both have a reaction rate of about 0.57 $gr/(m^2 \cdot hr)$.

The fact that the TK-2 curve reaches its peak in about 0.5 hours while the PPF curve takes about 0.9 hours to reach its peak has great practical significance. Suppose, for example, that both the TK-2 solution and the PPF solution, under comparable pumping pressures, penetrate a given formation material to an equal distance of one half meter in the first one half hour of the treatment. Further suppose that both the TK-2 solution and the PPF solution (again under comparable pumping pressures) penetrate the formation to an equal distance of one meter in the first full hour of the treatment. Similarly, suppose that the TK-2 solution and the PPF solution (once again under comparable pumping pressures)

thereafter each penetrate the formation an additional one half meter for each additional half hour of treatment time. Those skilled in this art will appreciate that this linear, one half meter per one half hour penetration, rate is a highly "idealized" assumption. It is however applied to both the TK-2 and the PPF solutions. These idealized assumptions also neglect the motive power supplied to the PPF solution by its oxygen gas product. Nonetheless, these assumptions are useful in making the general points applicant wishes to make. That is to say that, under such uniform penetration distance versus time assumptions, FIG. 1 shows that the TK-2 solution has penetrated about one half meter into the formation as it reaches its maximum rate of reaction (0.8 gr/(m$^2$·hr)). However, by the time the TK-2 solution has penetrated the formation to a distance of about 1 meter (i.e., in one hour), its rate of reaction has fallen to about 0.34 gr/(m$^2$·hr). Thereafter, the TK-2 curve decays more slowly. For example, after about 4.7 hours, the TK-2 solution's rate of reaction is about 0.18 gr/(m$^2$·hr). This is also a second point S where the TK-2 curve and the PPF curve again intersect.

Comparing the TK-2 curve with the PPF curve one also notes that at one half hour's time (when the PPF solution has penetrated the formation to a distance of one half meter), the PPF solution's reaction rate has not yet reached its maximum. Stated another way, the PPF curve reaches its maximum (0.62 gr/(m$^2$·hr)) after about 0.9 hours time and after the PPF solution has penetrated the formation to a distance of about one meter. Again, by way of comparison, the TK-2 solution reaches its peak reaction rate when it has penetrated the formation to a distance of only about one half meter. In other words, when the PPF curve has reacted its peak (0.62 gr/(m$^2$·hr)) the TK-2 curve has fallen to about 0.34 gr/(m$^2$·hr) (which is less than half of its one half hour peak value of about 0.8 gr/(m$^2$·hr)). Thereafter, the PPF reaction rate remains above the TK-2 reaction rate until the two curves finally cross again at point S, i.e., at about 0.18 gr/(m$^2$·hr) after about 4.7 hours. Hence, FIG. 1 shows that the PPF solution remains more reactive (relative to the TK-2 solution) after about 0.6 hour's time and remains more reactive up to about 4.7 hour's time. Stated another way, the area under the PPF curve and above the TK-2 curve between their first point of intersection F (0.6 hours and 0.57 gr/(m$^2$·hr)) and their second point of intersection S (4.7 hours and 0.18 gr/(m$^2$·hr)) represents an area of improved ability of the PPF solution (relative to the TK-2 solution) to act as a mineral formation permeability enhancing agent.

Table 1 shows the relative abilities of certain representative subterranean treatment solutions of this patent disclosure to dissolve a representative silica mineral (i.e., quartz in the form of quartz tubes). These solutions employed a representative PPF (KF.H$_2$O$_2$) in the varying proportions indicated (e.g., 10.0, 0.96 and 20 weight percent of the overall solution). A potassium hydrofluoride (KHF$_2$) stabilization agent was also employed in the varying proportions indicated (e.g., 10.0, 20.0 and 1.0 weight percent). All of these solutions also contained a surfactant and a corrosion inhibitor in the respective concentrations indicated (i.e., 0.8 weight percent and 0.05 weight percent). These tests were conducted at two representative temperatures (i.e., 20° C. and 70° C.). Contact times of 0.5, 1.0 and 5 hours were employed with respect to each composition. Table 1 (see line 4) also shows the relative ability of a prior art HCL-based, subterranean treatment solution to dissolve the subject quartz mineral. Since quartz is a silica mineral, the HCL-based, prior art solution (patented in Russia) was generally unable to chemically attack said mineral. This fact is reflected by the notation "Did not react." Generally speaking, Table 1 also indicates that as the contact time increases, the rate of reaction decreases while the quantity of quartz dissolved generally continues to increase. In comparing the dissolution effects of the 10, 0.96 and 20 weight percent KF.H$_2$O$_2$ solutions, it also will be generally noted that the higher KF.H$_2$O$_2$ concentrations (i.e., 10 and 20 percent) respectively dissolve more of the subject quartz material than the 0.96 KF.H$_2$O$_2$ solution.

Table 2 is similar to Table 1. The main distinctions are that the material being dissolved is a carbonate, the temperature is held constant (at 20° C.) and the contact times are measured in minutes, i.e., at 10, 30, 90 and 300 minutes. Table 2 indicates (see line 4) that the relative ability of a prior art (patented in Russia), HCL-based subterranean treatment solution to dissolve the subject carbonate material. Since the subject material is a carbonate, the HCL-based, prior art solution was able to chemically attack it. Thus, Table 2 demonstrates that these KF.H$_2$O$_2$ solutions were able to chemically attack a carbonate material as well as a quartz (silica) material. However, Table 2 also shows that the 10.0 and 0.96 percent KF.H$_2$O$_2$ solutions dissolved more of the subject carbonate material, while the results of the 20 percent KF.H$_2$O$_2$ solution were comparatively more modest. Nonetheless, all of the KF.H$_2$O$_2$ solutions generally dissolved more of the subject carbonate material than the HCL-based, prior art solution—especially in the earlier (e.g., 10 and 30 minute) stages in these experiments.

Table 3 shows a variation of tests that produced the results given in Table 1. The main difference between Table 1 and Table 3 is that Table 1 is concerned with the relative abilities of certain representative subterranean treatment solutions to dissolve quartz, while Table 3 is concerned with the relative abilities of the same representative subterranean treatment solutions to dissolve a representative clay (a silicate material). Table 3, like Table 1, also shows the relative ability of a prior art (patented in Russia) HCL-based, subterranean treatment solution to dissolve the subject clay material. Here again, since clay is a silicate material, the HCL-based, prior art solution was unable to chemically attack said material. This fact is reflected by the notation "Did not react." Generally speaking, Table 3 also indicates that as the contact time increases, the quantity of clay material dissolved generally increases. The negative numbers in the "Quantity of sample Dissolved, %" column of Table 3 follows from the fact that, in these cases, the subject clay material came out solution and formed particulate materials. Nonetheless, the structure of the subject clay material changed—even though solid particulate materials came out of solution—in a manner that increased the relative permeability of that subject clay material.

Table 4 shows the relative abilities of the subterranean treatment compositions of Table 1 to increase the permeability of a clay core sample. This clay core sample was taken from a well in the Koshil Oil Field in western Siberia. This permeability enhancement was established by pumping the various PPF treatment solutions given in Table 4 through respective core samples whose clay content was 10% by weight. The other factors associated with these tests are given at the top of Table 4. Here again, the results of these tests are compared to those produced by a prior art (patented in Russia) HCL-based solution. Generally speaking, Table 4 shows that each of the three KF.H$_2$O$_2$ compositions served to increase the permeability of the core clay material relative to the prior art HCL-based subterranean treatment solution.

TABLE 1

| Example | Composition Type | KF·H$_2$O$_2$ Mass % | KHF$_2$ | Water pH | Alkyl Phosphate Surface Active Agent Surfactant, Mass % | Corrosion Inhibitor Composition % | Temp. °C | Contact Time Hrs | Rate of Reaction, g/m$^2$·hr | Quantity of sample Dissolved, % |
|---|---|---|---|---|---|---|---|---|---|---|
| 1 | PPF | 10.0 | 10.0 | 2 | 0.8 | 0.05 | 20 | 0.5 | 0.8 | 0.034 |
|   |     |      |      |   |     |      |    | 1   | 0.4 | 0.034 |
|   |     |      |      |   |     |      |    | 5   | 0.11 | 0.046 |
|   |     |      |      |   |     |      | 70 | 0.5 | 0.91 | 0.038 |
|   |     |      |      |   |     |      |    | 1   | 0.82 | 0.067 |
|   |     |      |      |   |     |      |    | 5   | 0.15 | 0.059 |
| 2 | PPF | 0.96 | 20.0 | 6.5 | 0.8 | 0.05 | 20 | 0.5 | 0.78 | 0.035 |
|   |     |      |      |   |     |      |    | 1   | 0.33 | 0.028 |
|   |     |      |      |   |     |      |    | 5   | 0.16 | 0.066 |
|   |     |      |      |   |     |      | 70 | 0.5 | 0.18 | 0.008 |
|   |     |      |      |   |     |      |    | 1   | 0.96 | 0.078 |
|   |     |      |      |   |     |      |    | 5   | 0.8 | 0.34 |
| 3 | PPF | 20 | 1 | 10 | 0.8 | 0.05 | 20 | 0.5 | 0.53 | 0.023 |
|   |     |      |      |   |     |      |    | 1   | 0.62 | 0.052 |
|   |     |      |      |   |     |      |    | 5   | 0.14 | 0.058 |
|   |     |      |      |   |     |      | 70 | 0.5 | 1.22 | 0.05 |
|   |     |      |      |   |     |      |    | 1   | 0.44 | 0.038 |
|   |     |      |      |   |     |      |    | 5   | 0.32 | 0.13 |
| 4 | Prior Art Solution[1] |  |  |  |  |  |  |  | Did not react | |

[1] A prior art, HCL-based, solution was used as a basis for comparison of the solutions of this patent disclosure. It did not react.

TABLE 2

| Example | Composition Type | KF·H$_2$O$_2$ Mass % | KHF$_2$ | Water pH | Alkyl Phosphate Surface Active Agent Surfactant, Mass % | Corrosion Inhibitor Comp % | Temp. °C | Contact Time, Min | Rate of Reaction, g/m$^2$·hr | Quantity of sample Dissolved, % |
|---|---|---|---|---|---|---|---|---|---|---|
| 1 | PPF | 10.0 | 10.0 | 2 | 0.8 | 0.05 | 20 | 10 | 117.8 | 25.45 |
|   |     |      |      |   |     |      |    | 30 | 56.22 | 66.58 |
|   |     |      |      |   |     |      |    | 90 | 12.03 | 31.93 |
|   |     |      |      |   |     |      |    | 300 | 5.01 | 5.11 |
| 2 | PPF | 0.96 | 20.0 | 6.5 | 0.8 | 0.05 | 20 | 10 | 332.2 | 47.89 |
|   |     |      |      |   |     |      |    | 30 | 57.34 | 23.23 |
|   |     |      |      |   |     |      |    | 90 | 4.09 | 4.99 |
|   |     |      |      |   |     |      |    | 300 | 0.07 | 0.29 |
| 3 | PPF | 20 | 1 | 10 | 0.8 | 0.05 | 20 | 10 | 83.25 | 11.1 |
|   |     |      |      |   |     |      |    | 30 | 58.77 | 25.8 |
|   |     |      |      |   |     |      |    | 90 | 21.29 | 28.8 |
|   |     |      |      |   |     |      |    | 300 | 0.67 | 2.87 |
| 4 | Prior Art Solution[1] |  |  |  |  |  | 30 | 10 | 107.8 | 12.8 |
|   |     |      |      |   |     |      |    | 30 | 65.23 | 23.61 |
|   |     |      |      |   |     |      |    | 90 | 10.43 | 15.45 |
|   |     |      |      |   |     |      |    | 300 | 0.3 | 1.09 |

[1] A prior art, HCL-based, solution was used as a basis for comparison of the solutions of this patent disclosure. The last line (4th) in this Table 2 is for that prior art, HCL-based, solution.

TABLE 3

| | | Composition of System | | | | | | Clay Dissolving Reaction | |
|---|---|---|---|---|---|---|---|---|---|
| Example | Composition Type | KF · $H_2O_2$, Mass % | $KHF_2$ | Water pH | Phosphate Surface Active Agent, Mass % Surfactant | Corrosion Inhibitor Comp % | Temp. °C. | Contact Time hr | Clay Dissolving Rate of Reaction, % |
| 1 | PPF | 10.0 | 10.0 | 2 | 0.8 | 0.05 | 70 | 0.5 | −8.9 |
|   |     |      |      |   |     |      |    | 1   | 3.94 |
|   |     |      |      |   |     |      |    | 5   | 0.84 |
| 2 | PPF | 0.96 | 20.0 | 6.5 | 0.8 | 0.05 | 70 | 0.5 | 4.12 |
|   |     |      |      |   |     |      |    | 1   | 2.01 |
|   |     |      |      |   |     |      |    | 5   | 8.34 |
| 3 | PPF | 20 | 1 | 10 | 0.8 | 0.05 | 70 | 0.5 | −26 |
|   |     |      |      |   |     |      |    | 1   | −2.28 |
|   |     |      |      |   |     |      |    | 5   | −1.27 |
| 4 | Prior Art Solution[1] |  |  |  |  |  | 70 |  | Did not react |

[1] A prior art, HCL-based, solution was used as a basis for comparison of the solutions of this patent disclosure. It did not react.

TABLE 4

Quantity of Clay in the Cores: 10 Mass %, Porosity - 12.26%, Pore Value - 3.85 $CM^3$, Cubic CM Initial Permeability, Based on Water $2.8 \cdot 10^{-3}$ $MKM^2$, Pressure: 5 Mega Pascal

| | | Composition of System | | | | | | | Permeability of Samples (Core) Based on Water, After Treatment KH, $10^3$ $MKM^2$ |
|---|---|---|---|---|---|---|---|---|---|
| Example | Composition Type | KF · $H_2O_2$, Mass % | $KHF_2$ | Water pH | Phosphate Surface Active Agent Surfactant, Mass % | Corrosion Inhibitor Comp % | Temp. °C. | Pressure Mega Pascal | |
| 1 | PPF | 10.0 | 10.0 | 2 | 0.8 | 0.05 | 70 | 5 | 8.59 |
| 2 | PPF | 0.96 | 20.0 | 6.5 | 0.8 | 0.05 | 70 | 5 | 4.31 |
| 3 | PPF | 20 | 1 | 10 | 0.8 | 0.05 | 70 | 5 | 5.26 |
| 4 | Prior Art Solution[1] |  |  |  |  | 0.05 | 70 | 5 | 3.97 |

[1] A prior art, HCL-based, solution was used as a basis for comparison of the solutions of this patent disclosure. The last line (4th) of this Table 4 is for that prior art solution.

This patent disclosure sets forth a number of embodiments of the present invention. Those skilled in these arts will however appreciate that various changes, modifications, methods of use, and compositional variations could be practiced under the teachings of this patent without departing from its scope as set forth in the following claims.

The invention claimed is:

1. A method for treating a subterranean formation in order to increase its permeability, said method comprising:
   preparing a treatment solution containing a peroxysolvate of potassium fluoride compound and a carrier fluid; and contacting the subterranean formation with said treatment solution.

2. The method of claim 1 wherein the peroxysolvate of potassium fluoride compound is potassium fluoride hydroperoxide ($KF.H_2O_2$).

3. The method of claim 1 wherein the peroxysolvate of potassium fluoride compound is potassium fluoride dihydroperoxide ($KF.2H_2O_2$).

4. The method of claim 1 wherein the peroxysolvate of potassium fluoride compound is potassium fluoride trihydroperoxide ($KF.3H_2O_2$).

5. The method of claim 1 wherein the peroxysolvate of potassium fluoride compound is selected from the group consisting of potassium fluoride hydroperoxide ($KF.H_2O_2$), potassium fluoride dihydroperoxide ($KF.2H_2O_2$) and potassium fluoride trihydroperoxide ($KF.3H_2O_2$).

6. The method of claim 1 wherein the carrier fluid is an aqueous solution.

7. The method of claim 1 wherein the treatment solution contains at least about 0.5 weight percent of the peroxysolvate of potassium fluoride compound.

8. The method of claim 1 wherein the treatment solution contains between about 0.7 and about 20.0 weight percent of the peroxysolvate of potassium fluoride compound.

9. The method of claim 1 wherein the treatment solution further comprises a potassium hydrofluoride ($KHF_2$) stabilization agent.

10. The method of claim 1 wherein the treatment solution further comprises potassium hydrofluoride ($KHF_2$) component that constitutes at least 0.5 weight percent of the treatment solution.

11. The method of claim 1 wherein the treatment solution is aqueous in nature, contains at least about 0.5 weight percent potassium fluoride hydroperoxide ($KF \cdot H_2O_2$) and further comprises at least about 0.5 weight percent potassium hydrofluoride ($KHF_2$).

12. The method of claim 1 wherein the treatment solution further comprises a corrosion inhibitor agent.

13. The method of claim 1 wherein the treatment solution further comprises a pH adjustment agent.

14. The method of claim 1 wherein the treatment solution further comprises a surface active agent.

* * * * *